United States Patent
Czarnetzki et al.

(10) Patent No.: US 6,825,454 B2
(45) Date of Patent: Nov. 30, 2004

(54) AUTOMATIC FOCUSING DEVICE FOR AN OPTICAL APPLIANCE

(75) Inventors: Norbert Czarnetzki, Jena (DE); Thomas Scheruebl, Jena (DE); Stefan Mack, Freiberg (DE); Toshiro Kurosawa, Saitama (JP); Eckard Hagemann, Jena (DE)

(73) Assignee: Carl Zeiss Microelectronic Systems GmbH, Jena (DE)

( * ) Notice: Subject to any disclaimer, the term of this patent is extended or adjusted under 35 U.S.C. 154(b) by 0 days.

(21) Appl. No.: 10/473,830

(22) PCT Filed: Jun. 4, 2002

(86) PCT No.: PCT/EP02/06083
§ 371 (c)(1),
(2), (4) Date: Feb. 19, 2004

(87) PCT Pub. No.: WO02/099501
PCT Pub. Date: Dec. 12, 2002

(65) Prior Publication Data
US 2004/0129858 A1 Jul. 8, 2004

(30) Foreign Application Priority Data
Jun. 5, 2001 (DE) .......................................... 101 27 284

(51) Int. Cl.$^7$ ................................................. G01J 1/20
(52) U.S. Cl. ................................ 250/201.3; 250/201.2; 359/381; 356/609
(58) Field of Search .......................... 250/201.2, 201.3, 250/201.4, 201.5, 201.8, 204; 359/368, 381, 383; 356/601, 609, 624

(56) References Cited

U.S. PATENT DOCUMENTS 5,239,170 A  8/1993  Hughlett ................... 250/201.3
5,248,876 A  9/1993  Kerstens et al. .......... 250/201.3
5,604,344 A * 2/1997  Finarov .................... 250/201.3
6,677,565 B1 * 1/2004  Wahl et al. ............... 250/201.3

FOREIGN PATENT DOCUMENTS

DE   197 13 362    10/1998
WO   WO 01/37025   5/2001

* cited by examiner

Primary Examiner—Kevin Pyo
(74) Attorney, Agent, or Firm—Reed Smith LLP

(57) ABSTRACT

The invention is directed to an arrangement for autofocusing onto a measuring location on an object moving in a direction which is at least approximately vertical to the optical axis of the imaging optics. According to the invention, a diaphragm device is to be provided the diaphragm opening of which extends in a direction aligned with the direction of movement of the measuring location; a receiving device for the measuring light has receiving areas arranged in a row beside each other and is inclined relative to the optical axis so that the image from the diaphragm device is incident on the receiving areas at an inclination of an angle $\alpha$; wherein the receiving device and the diaphragm opening are positioned relative to each other in such a way that characteristic measuring values are measured on the receiving areas when the measuring location is in or near the focus position. An evaluating device compares the measured values read sequentially from the receiving areas with stored desired values and from them generates signals, for example, for a microscope arrangement and/or—if deviations have been determined—for correcting signals for a relocation device by means of which the relocation of the direction of movement into the focal plane of the imaging optics is effected.

16 Claims, 4 Drawing Sheets

Direction of inclination

Direction of inclination

AUTOMATIC FOCUSING DEVICE FOR AN OPTICAL APPLIANCE

CROSS-REFERENCE TO RELATED APPLICATIONS

This application claims priority of International Application No. PCT/EP02/06083, filed Jun. 4, 2002 and German Application No. 101 27 284.7, filed Jun. 5, 2001, the complete disclosures of which are hereby incorporated by reference.

BACKGROUND OF THE INVENTION a) Field of the Invention

The invention is directed to an autofocusing device for an optical instrument, in particular for a microscope.

b) Description of the Related Art

Autofocusing devices are used where there is a need for bringing an object that is to be observed or to be examined into a position that is as precise as possible relative to the observation instrument, in particular into the focal point of the observation instrument. A large number of commonly known autofocusing devices use their own illumination source, the light of which is directed onto the object and evaluated after interaction with the object for the purposes of determining a distance or a deviation from a reference position. When the distance or the deviation from the reference position is known, an automatic position correction can be carried out.

From the state of the art, autofocusing devices for optical instruments are known which essentially differ with regards to the following performance parameters:

Resolution in direction of the optical axis (subsequently referred to as the z-axis), depth of the capture or working range, whether generating a directional signal for a correcting adjusting movement is possible, attainable measuring speed.

The triangulation methods often used for determining distances permit a relatively large capture range, but they are limited to values to the order of approximately 300 nm with regards to the resolution along the z-axis, and therefore unsuitable for the optical inspection of semiconductor components (wafers), since for these resolutions to values to the order of approximately 50 nm with a capture range of a several micrometers are necessary.

Autofocusing devices which are, for example, used in CD-players have a relatively large capture range and furthermore attain a high z-resolution, but only if the surface to be measured has very good reflective properties, since otherwise the z-resolution in particular drops off sharply.

The aforementioned autofocusing devices usually direct laser light onto the object that is to be examined, but if the wavelength spectrum of the main system differs a lot from the autofocusing system, systematic focusing errors result which amongst other things depend on the material properties and the microstructure, for example a surface coating, of the object to be examined.

OBJECT AND SUMMARY OF THE INVENTION

Based on this, it is the primary object of the invention to create an autofocusing device which permits high focusing precision and high focusing speed combined with simple construction.

For an autofocusing device for which the illuminating light is directed through imaging optics onto an object moving in a direction at least approximately vertical to the optical axis of the imaging optics, this object is met by arranging a diaphragm device in the illumination ray path between illumination source and imaging optics with at least one diaphragm opening which extends in a direction aligned with the direction of movement of the object; by arranging a receiving device in the measuring light ray path for the measuring light coming from a measuring location on the object, which receiving device has separate reception areas that can be evaluated individually and that are arranged in a row beside each other in a direction aligned with the direction of movement of the object; by inclining the diaphragm opening relative to the optical axis of the illumination ray path or the receiving areas arranged in a row beside each other relative to the optical axis of the measuring ray path by an angle such that 0 degrees$<\alpha<$90 degrees by means of which the image of the diaphragm opening is inclined relative to the receiving areas while the receiving device and the diaphragm opening are positioned relative to each other in such a way that characteristic measuring values are measured by the receiving areas when the measuring location is in or near the in-focus position; by the presence of a synchronous control which initializes the sequential reading of the measuring results in the receiving areas, wherein at the time ($t_1$) of read-out the receiving device ($e_1$) the measuring location is in a position ($p_1$), at the time ($t_2$) of read-out the receiving device ($e_2$) the measuring location is in a position ($p_2$) and so forth, and an evaluating device is provided which compares the measured values read from the receiving areas with desired values and from these generates signals for the optical instrument.

Preferably, the evaluation device is to be designed for the generation of adjusting signals for an adjusting device by means of which the direction of movement of the object into the focal plane of the imaging optics is initialized if there is a deviation between the read out measuring values and the stored desired values.

The imaging optics can nonetheless also be designed for the determination of other command signals for the optical instrument, for example for the activation of an image recording device and similar things.

Because of the inclination of the diaphragm device relative to the optical axis of the illuminating light or the inclination of the receiving device relative to the optical axis of the measuring light, an intensity distribution results on the receiving device which is aligned with the direction of movement of the object and which is characteristic for the position of the measuring location relative to the imaging optics.

The path of movement of the measuring location intersects with an imaginary plane the location of which is determined by the fact that if a mirror were to be inserted into the optical system in this location it would effect an optical conjugation of areas on the diaphragm device with assigned receiving areas and that the characteristic measuring values can be read out when the moving measuring location touches this imaginary plane.

By means of this, the autofocusing device according to the invention permits multiple measurements of the same measuring location on one object by means of one slit aperture or of a row of individual diaphragms, so that a set of data is available for the evaluation of the focal position. Such multiple measurements are particularly advantageous if the surface structure of the objects to be examined is highly fissured.

Advantageously, a device for the continuous advance of one or more objects can be present, which device is coupled to a synchronous control, wherein the direction of advance should be at right angles to the optical axis of the imaging optics.

The arrangement according to the invention described so far is more suited for the gathering of measuring values relating to the focal position of a moving object or of a measuring location; such an operating mode, where the imaging optics and the object are moving relative to each other, is here to be referred to as a "dynamic" operating mode, wherein the movement can, for example, be continuous or also a stepped advance movement of the object.

For a "static" operating mode, on the other hand, where the image information is to be gained about measuring locations on objects which are at rest relative to the imaging optics, the following arrangement according to the invention is better suited.

For this autofocusing device, the illuminating light is directed through imaging optics onto the surface of an object at rest; a diaphragm device is provided in the ray path between the illumination source and the imaging optics which has at least one diaphragm opening and extends in a preferred direction V; a receiving device for the measuring light coming from the measuring object is present which has receiving areas arranged in a row in a direction V' corresponding to the preferred direction V and which can be evaluated individually; furthermore, the diaphragm opening and the optical axis of the illumination ray path or the receiving areas arranged in a row and the optical axis of the measuring ray path form an angle such that 0 degrees<α<90 degrees, so that the image of the diaphragm device is incident on the receiving area at an inclination of the angle α and measuring light is incident on one of the receiving areas at maximum intensity when an assigned partial area of the diaphragm opening is in conjugation with this receiving area; an adjusting device for changing the distance of the object from the optical axis is present, and an evaluating device is provided which outputs information about having reached the focal position when during the course of the change of distance the measuring light causes measuring values on the receiving areas which correspond to preset comparative values.

Here also, the characteristic measuring values can be read when a measuring location is on an imaginary plane the location of which is determined by the fact that if a mirror were to be inserted into the optical system in this location an optical conjugation of areas on the diaphragm device with assigned receiving areas would be effected.

In this way, a change of position of a chosen measuring location relative to the focal point of the imaging optics can be initialized until this measuring location has reached the focal position.

This autofocusing device can furthermore be designed in such a way that the autofocusing device first determines that receiving area on which at a current distance z of the object surface from the imaging optics the maximal measuring light intensity is incident. After this, the difference is determined between the position of this receiving area and the position of a predetermined receiving area on which the maximal light intensity is only incident if the distance z corresponds to the focus distance. From this difference, a correcting variable is generated which corresponds to a distance for the adjusting movement.

If the adjusting device is, for example, equipped with an electric motor as a drive, a change of the distance z can be caused via the correcting variable until the maximal measuring light intensity impinges on the predetermined receiving area and the focus position is therefore reached and focusing is completed.

The receiving device can be realized in the autofocusing device for the "dynamic" as well as the "static" operating mode as a row of receivers which consists of a large number of individual sensors arranged in a row beside each other, wherein each receiving area corresponds to one individual sensor. In this case, the diaphragm device can advantageously be designed and arranged in the ray path in such a manner that it creates an "illumination line" which is incident lengthwise on the receiver row and overlaps it.

It is essential for the function of the arrangement according to the invention that either the diaphragm opening or the receiving device form an angle such that 0 degrees<α<90 degrees with the respective optical axis of the ray path into which they have been inserted. It can also be envisaged that the diaphragm device as well as the receiving device are to be inclined against the ray path, but this requires predetermining differing angles of inclination for the image of the diaphragm device as well as the image of the receiving device.

A realization has, for example, proven itself for which the diaphragm opening is aligned vertical to the optical axis of the illumination ray path while the row of receivers forms an angle α=45 degrees with the optical axis of the measuring ray path.

The diaphragm opening can, for example, be realized as a slit opening, wherein each individual sensor is assigned to one section of the slit opening. As an alternative, the diaphragm opening can also be realized as a pinhole diaphragm with a large number of individual pinholes arranged in a row beside each other, wherein, for example, one individual diaphragm is assigned as a partial area to each individual sensor.

A one dimensional CCD-array can be provided as the row of receivers, wherein one or more pixels of the one dimensional CCD-array respectively correspond to one individual sensor or one receiving area.

With the autofocusing device in the embodiment forms described so far, resolutions in direction of focusing with values to the order of 50 nm can be achieved for applications in connection with microscopes. Here, a capture range of a size to the order of several micrometers within which a meaningful signal is captured is possible.

For realizations of the autofocusing device which are adapted to particular applications, the diaphragm device can have a number of parallel slit openings or rows of individual diaphragms and by this generate a number of "illumination lines" incident on the receiving device. For these cases, the receiving device can have a number of rows of receivers aligned parallel to each other, wherein again—as has already been described—one individual sensor can be assigned to a partial area of the slit openings or to one of the individual diaphragms for the purpose of evaluation.

It can also be envisaged that the receiving device is realized as an area position-sensitive detector and that each partial area of the area detector is optically assigned to a slit opening or an individual pinhole.

In principle, it is possible to use the measured intensities or brightness values directly for evaluating the focus position and to gain a signal from this with which the maximum of the intensity distribution can be determined, but it can also be envisaged that local contrast values instead of local intensities are measured and that further processing is based upon these.

The autofocusing device according to the invention can, for example, be implemented as a separate optical system in a microscope, wherein the optical system for the autofocusing device and the main system of the microscope are realized as separate subassemblies.

It is more advantageous, though, to share the use of functionally essential optical subassemblies for the autofocusing device as well as the microscope ray path by, for example, arranging the diaphragm of the autofocusing device in the illumination ray path between illumination source and imaging optics of a microscope, that is, roughly in the marginal area of an luminous field diaphragm. In this case, there is a multiple use of illumination source and imaging optics, by means of which a reduction of the number of system components and in particular a compact construction can be achieved.

The shared use of an illumination source has the added advantage that the autofocusing device is operating in the same wavelength range as the optical main system. This avoids systematic errors based on wavelength differences and therefore guarantees particularly high focusing precision.

The invention is subsequently to be explained by an embodiment example.

DESCRIPTION OF THE PREFERRED EMBODIMENTS

Figure 1:
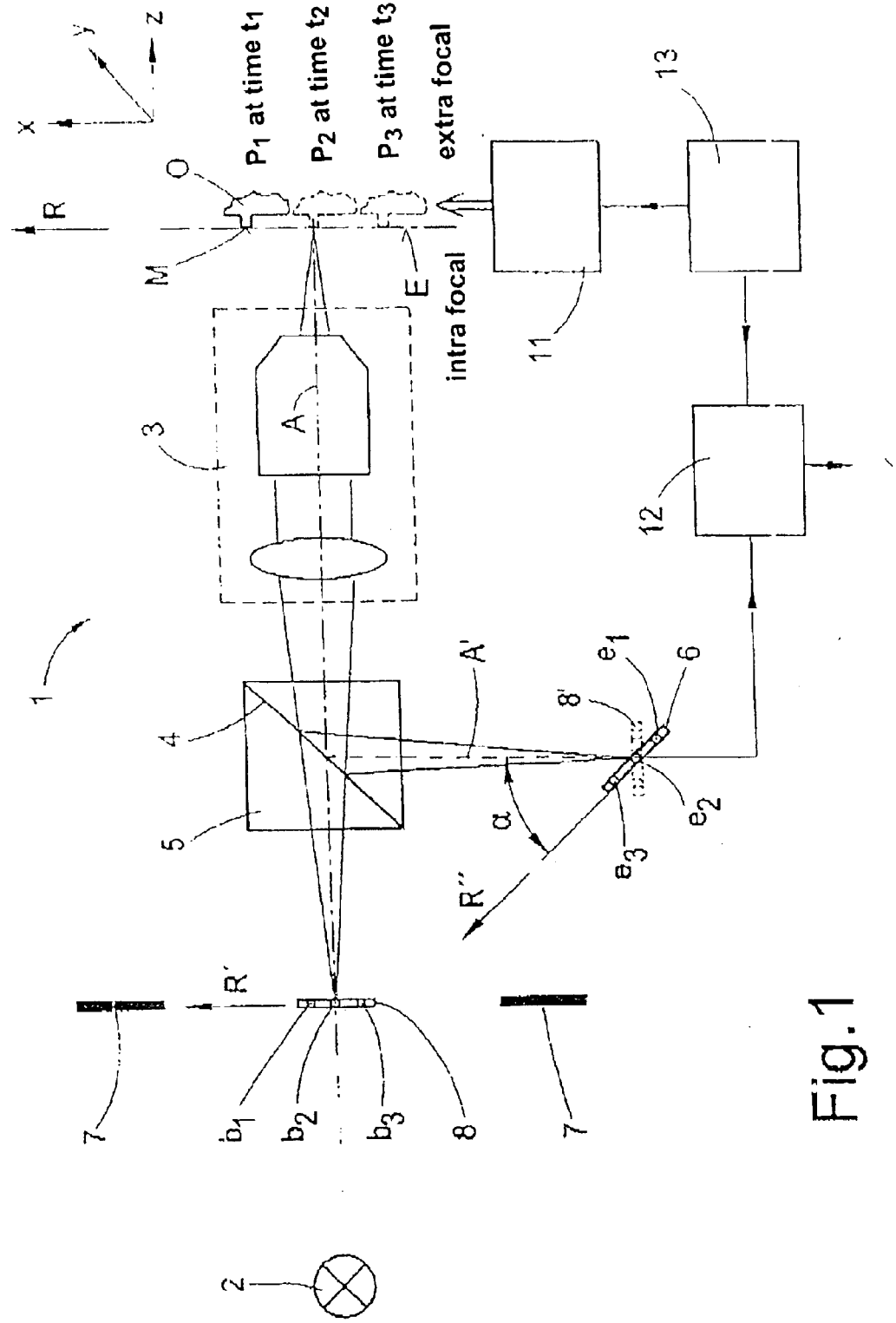
FIG. 1 shows a schematic view of an autofocusing device, which is particularly suited for the "dynamic" operating mode, meaning for moving objects.

The embodiment example in FIG. 1 shows an autofocusing device 1 which, for example, is integrated into a microscope the construction of which can be assumed to be known. Let the microscope be provided for the inspection of surface structures of wafers. Of course, a microscope with such an autofocusing device 1 could also be used for the examination of other object surfaces with a similarly fine surface structure.

The autofocusing device 1 comprises an illumination source 2, which can either be a separate source or also the illumination source of the microscope, and which emits light in the visible range of the spectrum.

Furthermore, imaging optics 3 are provided, which in turn are advantageously identical with the imaging optics of the microscope, and through which the light from the illumination source 2 is directed onto a measuring location M on the object O.

For the embodiment example described here, the object is moved continuously, whereby the measuring location M changes its position relative to the optical axis of the imaging optics 3 constantly and in consequence is in different positions $p_1, p_2, \ldots p_n$ at the times $t_1, t_2, \ldots t_n$. This type of use is therefore to be described as the "dynamic" operating mode.

The light reflected by the object O goes back to the imaging optics 3 and after passing through the imaging optics 3, it is deflected by the beam-splitting layer 4 of a beam splitter 5 towards a row of receivers 6. The principle of beam splitting or the blocking of parts of radiation is as such known and requires no further explanation here.

In the ray path between the illumination source 2 and the beam splitter 5 there is, for example, a luminous field diaphragm 7 which forms part of the microscope arrangement and in the area of which a slit diaphragm 8—here with only one slit opening—is arranged according to the invention.

For the sake of simplicity, the slit diaphragm is drawn in FIG. 1 in a coaxial position, so that the principle of the autofocusing according to the invention can be represented in a clearly laid out drawing; but it is more advantageous for the slit diaphragm 8 to be positioned out of center and on the periphery of the luminous field diaphragm 7 so that the illumination ray path of the microscope arrangement into which the autofocusing device 1 has also been inserted is not affected to an unacceptable degree.

A part of the radiation of the light coming from the illumination source 2 is shaped into an "illumination line" with the slit diaphragm 8, the purpose of which is connected to the alignment of the row of receivers 6 and to be explained below.

The slit opening of the slit diaphragm 8 and the row of receivers 6 are designed relative to each other in such a way that the "illumination line" generated by the slit opening falls lengthways onto the row of receivers 6 and would at least essentially cover it if instead of the object a mirror plane correspondingly positioned and tilted relative to plane E were to be inserted. The image 8' of the slit diaphragm 8 that would result if there were a mirror on plane E is indicated in FIG. 1.

The row of receivers 6, which for example consists of a large number of individual sensors—so-called "pixels"— arranged beside each other in a row is inclined relative to the image of the slit diaphragm 8 in such away that they form an angle $\alpha=45$ degrees.

The slit diaphragm 8 and the row of receivers 6 are furthermore positioned relative to each other in such a way that the light of the "illumination line" reflected by the object O impinges on the central receiving area $e_2$ of the row of receivers 6 or also generates a light structure on the central receiving area $e_2$ with maximum contrast when the path of movement of the measuring location M in the position $p_2$ intersects with that imaginary plane which effects an optical conjugation of areas on the diaphragm device with assigned receiving areas.

This is an indication of the fact that the measuring location M is in the focus of the imaging optics 3. For this, the receiving area $e_2$ can be formed by a number of pixels of the row of receivers 6, but preferably it would only be one.

If the measuring location M is in position $p_1$, relatively low brightness light from the partial area $b_1$ of the slit diaphragm 8 impinges on the receiving area $e_1$ of the row of receivers 6, or rather, generates a light structure on it which has relatively low contrast compared to the one on receiving area $e_2$, since the receiving area $e_1$ does not correspond with the focus position because of the inclination of the row of receivers 6 relative to the direction of incidence of the light. In other words, the partial area $b_1$ of the slit diaphragm 8 is imaged on the receiving area $e_1$ of the row of receivers 6 (for example, on one pixel of the row of receivers 6) out of focus.

For the same arrangement and for the position $p_3$, the partial area $b_3$ of the slit opening generates a light structure on the receiving area $e_3$ of the row of receivers which in comparison is less bright or has less contrast than position $p_2$ on the receiving area $e_2$, since partial area $b_2$ is also imaged on the receiving area $e_1$ of the row of receivers 6 out of focus because of the inclination of the row of receivers 6.

In other words, for each partial area of the diaphragm, there is therefore a z-position of a planar object aligned vertical to the optical axis of the autofocusing device for which this partial area is conjugate to a corresponding partial area on the row of receivers because of the inclined position of the row of receivers 6 relative to the slit diaphragm 8.

As can be gathered from FIG. 1, the difference between the defocused images of the partial areas $b_1$ and $b_3$ of the slit diaphragm 8 on the receiving areas $e_1$ and $e_2$ of the row of receivers 6 consists in the fact that the partial area $b_1$ is imaged extrafocally defocused and the partial area $b_2$ situated opposite is imaged intrafocally defocused. For the opposite inclination of the row of receivers 6 which can also be envisaged, this would be the other way around. The expressions extrafocal and intrafocal here refer to the defocusing.

The slit diaphragm 8 and the row of receivers 6 are arranged relative to each other in such a way that one partial area $b_1$, $b_2$ or $b_3$ of the slit diaphragm 8 is imaged on the corresponding receiving area $e_1$, $e_2$ or $e_3$ of the row of receivers 6. Because of the inclination of the row of receivers, different optical path lengths from the measuring location M to the receiving areas $e_1$, $e_2$ and $e_3$ result, which has the consequence that depending on the axial position of the measuring location M relative to the focus position of the imaging optics 3, only one partial area $b_1$, $b_2$ or $b_3$ of the slit diaphragm 8 is optically conjugate to a receiving area $e_1$, $e_2$ or $e_3$ of the row of receivers. For this, only the partial areas, receiving areas, and positions which are assigned to each other are taken into consideration, meaning that only the light coming from the measuring location M is evaluated.

Here, the width of the slit of the slit diaphragm 8 corresponds at least approximately to the size of the pixels of the row of receivers 6, so that a confocal optical condition is created vertical to the direction of the row. From this follows that the light intensity measured per pixel in the receiving areas $e_1$ and $e_3$ has to be lower than the light intensity measured per pixel in receiving area $e_2$ relating to the positions $p_1$, $p_2$, $p_3$.

Figure 2:
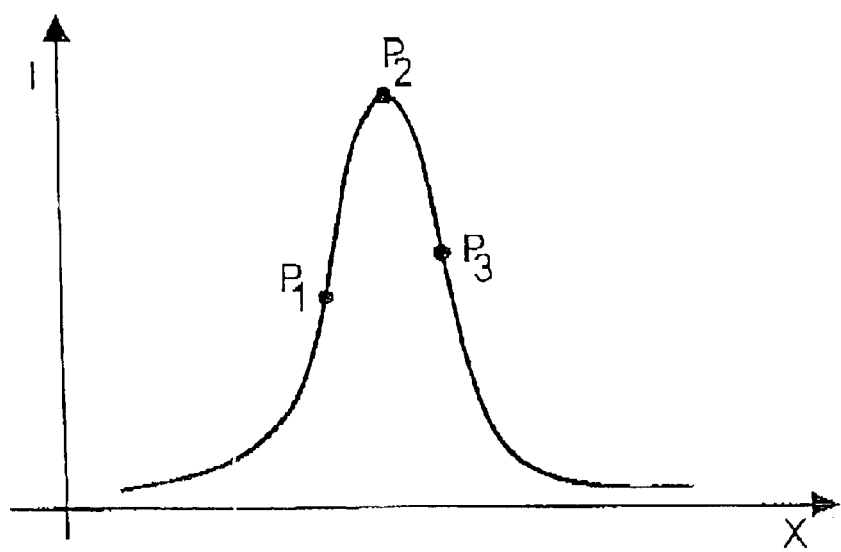
FIG. 2 shows the intensity distribution for a measuring location which has been moved vertical to the optical axis of the autofocusing device.

It must be emphasized that the partial areas $b_1$, $b_2$, $b_3$ and the receiving areas $e_1$, $e_2$, $e_3$ have only been chosen as examples for the purposes of illustration. When the whole row of receivers is analyzed, an intensity curve can be established, as it is shown in FIG. 2.

Subsequently, it is now to be assumed that the object O to be examined is moved. The direction of movement R is, for example, to coincide with the coordinate direction X which is aligned vertical to the optical axis A and here lies on the plane of the drawing in FIG. 1.

Let the object O have a protruding portion—for example a strip conductor—on which the measuring location M is located.

As an example, the positions $p_1$, $p_2$ and $p_3$ are now to be examined in which the measuring location M is situated at the times $t_1$, $t_2$ and $t_3$ during the movement of the object O.

The position $p_1$ of the measuring location M at the point in time $t_1$ corresponds to the position of the partial area $b_1$ of the slit diaphragm 8 and the position of the receiving area $e_1$ on the row of receivers 6; in consequence, the light reflected by the measuring location M in this position is imaged extrafocally defocused on the receiving area $e_1$ of the row of receivers 6.

After a further displacement of the object O, the measuring location M reaches the position $p_2$. Now, the receiving area $e_2$ and the partial area $b_2$ are conjugate to each other. The individual sensors in the receiving area $e_2$ of the row of receivers 6 signal maximum measuring light intensity and indicate by this that the measuring location M is in the focus position. The position $p_2$ is assigned the focus position by the evaluation device 12, since the maximum is measured at the point in time $t_2$ and in the receiving area $e_2$.

After a further displacement in x-direction, the measuring location M reaches the position $p_3$. Here, the partial area $b_3$ of the slit diaphragm 8 is imaged on the receiving area $e_3$ of the row of receivers 6 intrafocally defocused.

The intensities measured by the pixels of the row of receivers 6 assigned to the positions $p_1$, $p_2$ and $p_3$ depend on the respective position reached by the measuring location M when moving in x-direction and are shown as an intensity curve in FIG. 2. Each pixel of the row of receivers 6 and therefore its intensity value can be assigned to one x-position of the measuring location M. As has been shown above, the x-position here correlates to the respective partial area pairs $b_1/e_1$, $b_2/e_2$ and $b_3/e_3$ of the slit diaphragm 8 and the row of receivers 6.

A relocation device 11 is indicated in FIG. 1 which is, for example, coupled to a stage (not shown in the drawing) on which the object O has been placed.

A synchronous control 13 connected to the evaluation device 12 as well as the relocation device 11 ensures that the measuring values are read out from the corresponding receiving areas at the points in time $t_1$, $t_2$ and $t_3$ or when the measuring location M is in the positions $p_1$, $p_2$, $p_3$, so that the assignment of each of the measuring values to one position of the measuring location can be done in the evaluating device 12.

The intensity distribution along the x-axis shown in FIG. 2 corresponds—apart from a scaling factor—to the intensity distribution that results on the row of receivers 6 along the direction of inclination if the object O were a specular surface on a plane which contains the path of movement of the measuring location M.

For typical pixel sizes of a receiver row of approximately 10 μm and with an angle of inclination of $\alpha=45$ degrees, an axial sampling rate of the intensity curves of approximately 5 nm in the object space occurs for a magnification ×80 and for customary intermediary image sizes.

The discussion of the already described embodiment example is based on the embodiment of the diaphragm device as a slit diaphragm with only one slit opening and the embodiment of the receiving device with one row of receivers.

Figure 3:
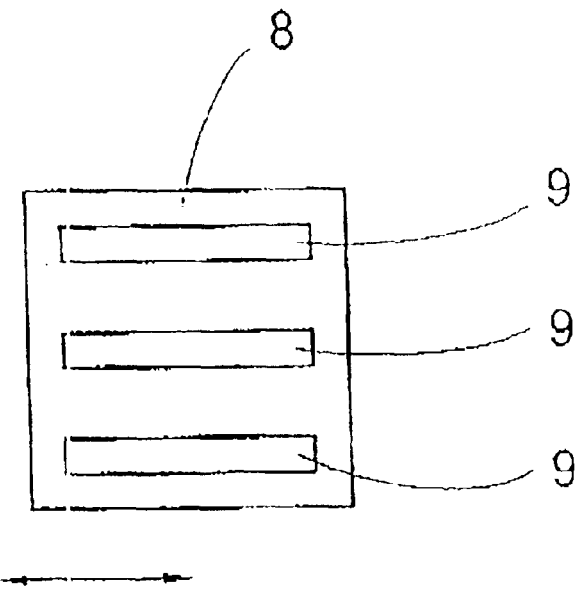
FIG. 3 shows as an example a view of a diaphragm device with a number of slit openings.

Embodiments could nonetheless also be envisaged for which the diaphragm device is realized as a slit diaphragm 8 with a number of adjacent slit openings 9, as it has been shown in FIG. 3. In connection with this, receiving devices can be used for which alternatively either a number of rows of individual sensors or individual sensors distributed over an area are present, or which are realized as area position-sensitive detectors.

Figure 4:
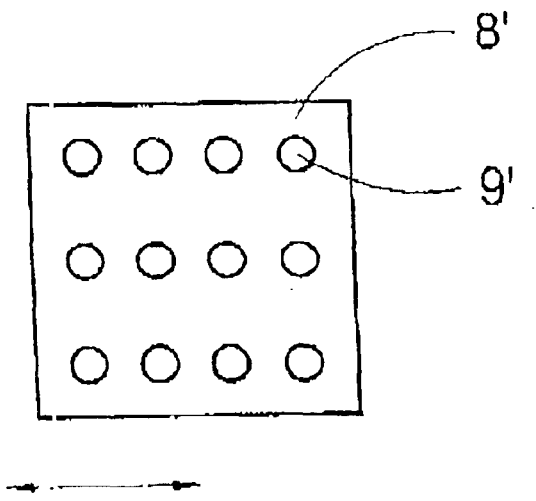
FIG. 4 shows as an example a view of a diaphragm device with a number of rows of individual diaphragms.

The diaphragm device can also consist of a large number of individual diaphragms which—as shown in FIG. 4—are distributed across an area. For this, each individual diaphragm 9' can be assigned to exactly one pixel of the receiving device; this results in a high resolution for the autofocusing device.

In conclusion, another embodiment example for the autofocusing device according to the invention which is particularly suited for the "static" operating mode, meaning for the autofocusing during measurements of unmoving objects, should be cited.

For this embodiment example subsequently to be described using FIG. 5, the illuminating light emitted by the illumination source 2 is directed onto the surface of a resting object O by means of imaging optics 3, and a slit diaphragm 8 is provided in the ray path between the illumination source 2 and the imaging optics 3.

Furthermore, a row of receivers 6 is present for the measuring light coming from the measuring location M which has receiving areas $e_1, e_2, \ldots e_n$ arranged in a row beside each other in a direction that corresponds to the direction of extent of the diaphragm opening and which areas can be evaluated separately.

The receiving areas $e_1, e_2, \ldots e_n$ arranged in a row form an angle of, for example, $\alpha=45$ degrees with the optical axis A' of the measuring ray path, and the receiving device and the diaphragm device are positioned relative to each other in such a way that the measuring light creates maximal brightness on a predetermined receiving area $e_2$ when the corresponding partial area $b_2$ of the slit opening is optically conjugate to the receiving area $e_2$.

An adjusting device 14 connected to a support on which the object rests (not shown here) is used for changing the distance z of the object O along the optical axis A. Finally, an evaluating device 12 is also provided here which outputs information about having reached the focus position for example when after a change of the distance z the measuring light causes a maximal brightness signal in the chosen receiving area $e_2$.

If the distance z changes after a change of position by means of the adjusting device 14, this results in a dislocation of the maximum along the row of receivers 6 because of the inclination of the row of receivers 6. The position of the maximum of the curve in FIG. 2 is therefore a measure of the distance of the measuring location M from the imaging optics 3.

The evaluating device now determines on which of the receiving areas $(e_1, e_2, \ldots e_n)$ the maximal light intensity impinges at the current distance z of the surface of the object O from the imaging optics 3. Next, the difference between the position of the receiving areas $e_1, e_2, \ldots e_n$ that has been determined thus and the position of the predetermined receiving area $e_2$, on which maximal measuring light intensity only impinges if the surface of the object is in the focal plane of the imaging optics 3, is calculated.

From this difference, a correcting value (S) is then generated in the evaluation device 12 and output to the drive of an adjusting device 14, and a change of the distance (z) is therefore caused depending on the correcting value (S) until the maximal measuring light intensity impinges on the predetermined receiving area $e_2$ and the object surface is therefore on the focal plane.

Methods and arrangements which allow the comparison of the signals gained from the row of receivers 6 with stored desired values, the calculation of the difference and the conversion of the result of the comparison into a correcting signal and its output to an adjusting device with control units are known from the state of the art and for this reason shall not be discussed in any detail.

For the "dynamic" as well as the "static" operating mode, further comparison quantities can first be determined from the intensity values for the evaluation of the focus position instead of direct further use of the measured intensities. A compensating curve could, for example, be calculated first from the intensities, the maximum of which could also be in between the measuring positions.

In the latter case with, for example, only one measurement, the intensity values of the individual receiving areas $e_1, e_2$ or $e_3$ are gained for different measuring locations on the object O to be examined and processed further, as shown. If these measuring locations are sufficiently close to each other, a precision of autofocusing that is satisfactory for a lot of purposes is attained. Since in this case only smaller measuring rates are required for data acquisition, a less expensive 2D-receiver with a two dimensional CCD-matrix can be used instead of a line receiver.

Figure 5:
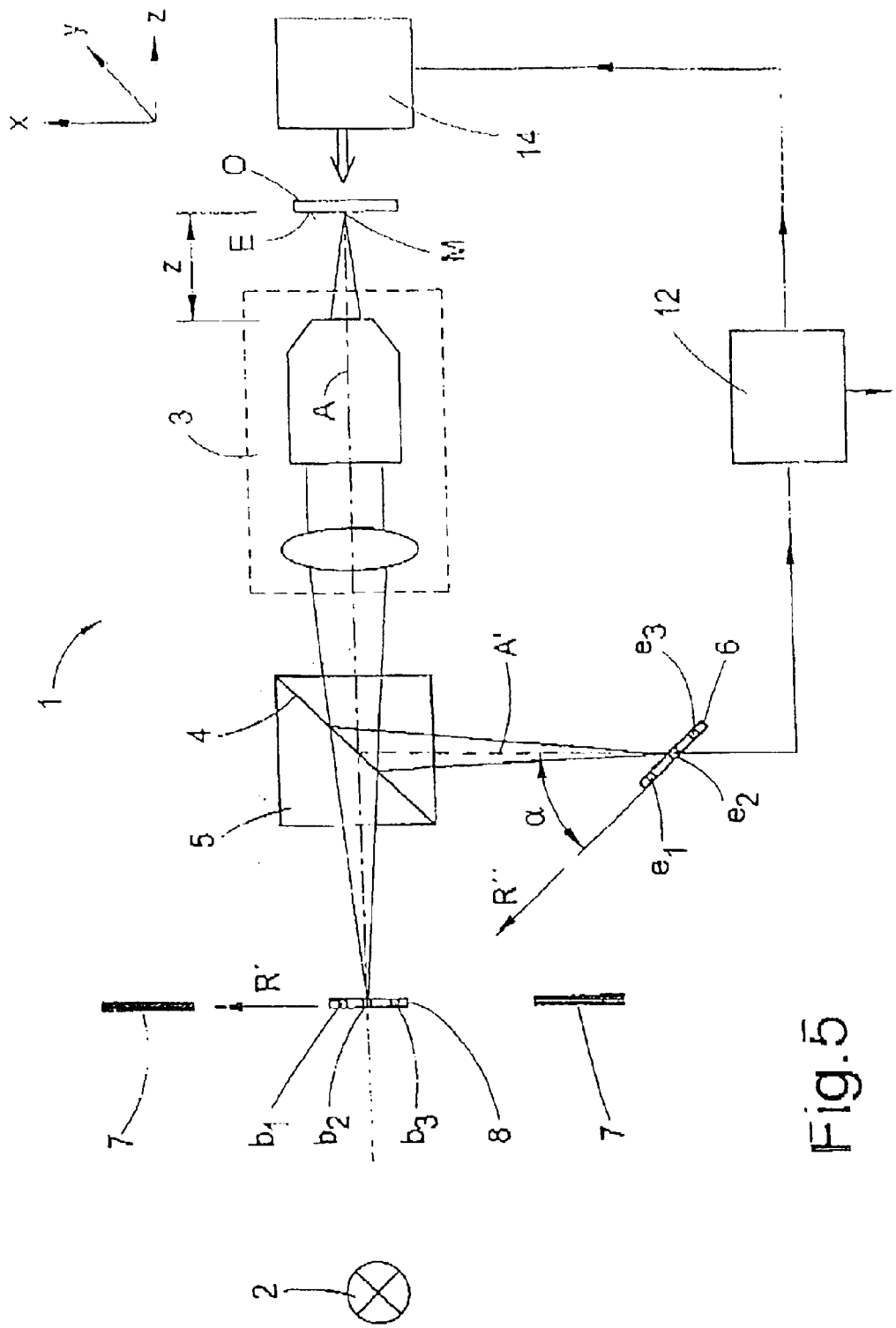
FIG. 5 shows a schematic view of an autofocusing device particularly suited for the "static" operating mode, meaning with non-moving objects.

In the two described embodiment examples according to FIG. 1 and FIG. 5, the row of receivers 6 is inclined relative to the optical axis A' of the measuring ray path, whereas the slit diaphragm 8 is arranged vertical to the optical axis A. In a modified embodiment variation, the slit diaphragm 8 could additionally also be inclined out of its position that is vertical to the optical axis A. Furthermore, it is possible only to incline the slit diaphragm 8 relative to the optical axis A and to arrange the row of receivers 6 in a position that is not inclined and vertical to the optical axis A. What is decisive in all cases is the inclination of the receiving areas relative to the images of the assigned diaphragm openings.

The latter case results in the advantage that the receiving device can be used at the same time as a detector for the optical main system of a microscope. For this, the slit diaphragm 8 is inserted into the ray path in such a way that it only takes up a very small part of the image field, so that the observation of the object O is not significantly affected by the autofocusing device 1 or the slit diaphragm 8.

It goes without saying that the autofocusing devices according to the invention, including their variations, can also be used in other optical instruments, for example projectors. In each case, high focusing precision is combined with high focusing speed.

While the foregoing description and drawings represent the present invention, it will be obvious to those skilled in the art that various changes may be made therein without departing from the true spirit and scope of the present invention.

| Reference list | |
| --- | --- |
| 1 | Autofocusing device |
| 2 | Illumination source |
| 3 | Imaging optics |
| 4 | Beam-splitting layer |
| 5 | Beam splitter |
| 6 | Row of receivers |
| 7 | Luminous field diaphragm |
| 8 | Slit diaphragm |
| 8' | Image of the slit diaphragm |
| 9 | Slit openings |
| 9' | Individual pinhole openings |
| 10 | |
| 11 | Relocation device |
| 12 | Evaluation device |
| 13 | Synchronizing device |
| 14 | Adjusting device |
| A | Optical axis |
| A' | Optical axis |
| $\alpha$ | Angle of inclination |
| $b_1, b_2, b_3$ | Partial areas |

-continued

| | Reference list |
|---|---|
| E | Plane |
| $e_1, e_2, e_3$ | Receiving areas |
| I | Intensity value |
| M | Measuring location |
| O | Object |
| $p_1, p_2, p_3$ | Locations |
| R | Direction of movement |
| R', V | Directions of the diaphragm openings |
| R", V' | Directions of the row of receivers |
| S | Correcting value |

What is claimed is:

1. An autofocusing device for an optical instrument, such as a microscope, wherein the illuminating light is directed through imaging optics onto an object moving in a direction at least approximately perpendicular to the optical axis of the imaging optics; comprising:

a diaphragm device being arranged in the illumination ray path between illumination source and imaging optics with at least one diaphragm opening which extends in a direction aligned with the direction of movement of the object;

a receiving device being arranged in the ray path for the measuring light coming from a measuring location on the object, which receiving device has separate receiving areas that can be evaluated individually and that are arranged in a row beside each other in a direction aligned with the direction of movement of the object;

said diaphragm having an opening being inclined relative to the optical axis of the illumination ray path or the receiving areas arranged in a row are inclined relative to the optical axis of the measuring ray path at an angle such that 0 degrees $<\alpha<90$ degrees, by means of which the image of the diaphragm opening is inclined relative to the receiving areas, while the receiving device and the diaphragm opening are positioned relative to each other in such a way that characteristic measuring values are measured by the receiving areas when the measuring location is in or near the focus position;

a synchronous control being present which initializes the sequential reading of the measuring results in receiving areas; and an evaluating device being provided which compares the measured values read from said receiving areas with desired values and from these comparisons generate signals for the optical instrument.

2. The autofocusing device according to claim 1, wherein the evaluation device is designed for the generation of adjusting signals for an adjusting device by which a relocation of the direction of movement of the object into the focal plane of the imaging optics is initialized if there is a deviation between the read out measuring values and the stored desired values.

3. The autofocusing device according to claim 1, wherein a device for the continuous advance of one or more objects with measuring locations in a direction is present which is coupled to a synchronous control.

4. An autofocusing device for an optical instrument, such as a microscope, wherein the illuminating light is directed through imaging optics onto a measuring location on an object comprising:

a diaphragm device being provided in the illumination ray path between the illumination source and the imaging optics which has at least one diaphragm opening that extends in a preferred direction;

a receiving device for the measuring light coming from the measuring location being present which has receiving areas arranged in a row in a direction that corresponds to the preferred direction and which areas can be evaluated individually;

said diaphragm opening and the optical axis of the illumination ray path or the receiving areas being arranged in a row and the optical axis of the measuring ray path forming an angle such that 0 degrees $<\alpha<90$ degrees, so that the image of the diaphragm device is incident on the receiving areas at an inclination of the angle $\alpha$ and measuring light is incident on one of the receiving areas at maximum intensity when an assigned partial area of the diaphragm opening is in conjugation with this receiving area;

an adjusting device for changing the distance of the measuring location in direction of the optical axis of the imaging device is present; and an evaluating device being provided which outputs information about having reached the focal position when during the course of the change of distance the measuring light causes measuring values on the receiving areas which correspond to predetermined comparative values.

5. The autofocusing device according to claim 4, wherein information about having reached the focus position is output by the evaluating device when the maximal measuring light intensity is measured in the predetermined receiving area.

6. The autofocusing device according to claim 4, wherein the evaluating device is designed for determining on which of the receiving areas the maximal measuring light intensity is incident for a given distance of a measuring location; the evaluating device is designed for the generation of a correcting value from the difference between the position of the receiving area thus determined and the position of a predetermined receiving area on which the maximal measuring light intensity is incident when a measuring location is in or close to the focus position; and wherein the adjusting device has a drive which is connected to the evaluating device and by which a change of the distance is initialized depending on the correcting value until the maximal measuring light intensity impinges on the predetermined receiving area.

7. The autofocusing device according to claim 4, wherein the receiving device is realized as a row of receivers which consists of a large number of individual sensors arranged beside each other in a row, wherein each individual sensor corresponds to one receiving area and wherein the diaphragm device is inserted in the ray path in such a manner that an "illumination line" impinges lengthways on the row of receivers and overlaps with it.

8. The autofocusing device according to claim 7, wherein the diaphragm opening is aligned vertical to the optical axis of the illumination ray path and the row of receivers is aligned relative to the optical axis of the measuring ray path at an inclination of $\alpha=54$ degrees.

9. The autofocusing device according to claim 8, wherein the diaphragm opening is realized as a continuous slit opening and in that a section of the slit opening has been assigned to each individual sensor of the row of receivers (6) as a diaphragm area.

10. The autofocusing device according to claim 8, wherein the diaphragm opening is realized as a pinhole diaphragm consisting of a large number of individual diaphragms arranged in a row beside each other and in that an individual diaphragm has been assigned to each individual sensor of the row of receivers (6) as a diaphragm area.

11. The autofocusing device according to claim 4, wherein a one dimensional CCD-array is provided as a row of receivers and wherein each pixel of the one dimensional CCD-array corresponds to one individual sensor.

12. The autofocusing device according to claim 4, wherein the diaphragm device has a number of parallel slit openings or rows of individual diaphragms and generates a number of "illumination lines" which are incident on the receiving device, and wherein the receiving device has a number of parallel rows of receivers, each with a number of individual sensors arranged in a row beside each other, wherein one individual sensor each is assigned to one diaphragm area.

13. The autofocusing device according to claim 4, wherein the receiving device is realized as an area position-sensitive detector and in that one receiving area each is assigned to one diaphragm area of a slit opening or to one individual pinhole diaphragm.

14. The autofocusing device according to claim 4, wherein a CCD-camera which takes continuous measurements is provided as a receiving device.

15. The autofocusing device according to claim 4, wherein the evaluating device is designed for the derivation of a contrast value from the measured intensity values and wherein the generation of the correcting value is based on the contrast value, wherein one pinhole diaphragm each is assigned to a number of individual sensors for the purposed of contrasting.

16. The autofocusing device according to claim 4, wherein the diaphragm device is inserted in the illumination ray path of the optical main system of a confocal microscope, in that the receiving device is part of the opto-electronic sensor of the main system of the confocal microscope and/or wherein the illumination source of the autofocusing device is also the illumination source for the main imaging system of a confocal microscope.

* * * * *